(12) United States Patent
Zemenchik et al.

(10) Patent No.: US 11,064,642 B2
(45) Date of Patent: Jul. 20, 2021

(54) AGRICULTURAL SHANK WITH PROTECTED SOIL SENSOR

(71) Applicant: CNH Industrial Canada, Ltd., Saskatoon (CA)

(72) Inventors: Robert A. Zemenchik, Kenosha, WI (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 9 days.

(21) Appl. No.: 15/499,210

(22) Filed: Apr. 27, 2017

(65) Prior Publication Data
US 2018/0310456 A1    Nov. 1, 2018

(51) Int. Cl.
| | | |
|---|---|---|
| *A01B 17/00* | (2006.01) | |
| *A01B 13/08* | (2006.01) | |
| *A01B 76/00* | (2006.01) | |
| *A01C 5/06* | (2006.01) | |
| *A01B 79/00* | (2006.01) | |
| *A01B 49/02* | (2006.01) | |
| *A01B 61/04* | (2006.01) | |

(52) U.S. Cl.
CPC .............. *A01B 17/00* (2013.01); *A01B 13/08* (2013.01); *A01B 76/00* (2013.01); *A01B 79/005* (2013.01); *A01C 5/062* (2013.01); *A01B 49/027* (2013.01); *A01B 61/046* (2013.01)

(58) Field of Classification Search
CPC ....... A01B 79/005; A01B 17/00; A01B 13/08; A01B 76/00; A01B 49/027; A01B 61/046; A01C 5/062
See application file for complete search history.

(56) References Cited

U.S. PATENT DOCUMENTS

| | | | |
|---|---|---|---|
| 5,033,397 A | | 7/1991 | Colburn, Jr. |
| 5,044,756 A | * | 9/1991 | Gaultney et al. .. G01N 21/8507 |
| | | | 356/446 |
| 5,461,229 A | | 10/1995 | Sauter et al. |
| 5,524,560 A | * | 6/1996 | Carter ................. A01B 63/114 |
| | | | 111/200 |
| 6,356,830 B1 | | 3/2002 | Adamchuck et al. |
| 6,484,652 B1 | | 11/2002 | Colburn, Jr. |

(Continued)

FOREIGN PATENT DOCUMENTS

| | | |
|---|---|---|
| CA | 2 640 137 A1 | 8/2007 |
| WO | 2006/015463 A3 | 2/2006 |
| WO | 2016/205422 A1 | 12/2016 |

OTHER PUBLICATIONS

Extended European Search Report dated Sep. 28, 2018 for European Patent Application No. 18 16 7587 (7 pages).

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural implement includes a chassis and a shank carried by the chassis. The shank includes: a shank body configured to penetrate a soil top surface; a sensor attached to an outer surface of the shank body and defining a probing area; and a sensor shield carried by the shank body in front of the sensor, the sensor shield being configured to deflect oncoming soil flow away from the sensor without substantially disrupting soil flow into the probing area.

12 Claims, 3 Drawing Sheets

(56) References Cited

U.S. PATENT DOCUMENTS

| | | | |
|---|---|---|---|
| 6,853,937 B2* | 2/2005 | Shibusawa etal. | A01B 79/005 250/253 |
| 8,862,339 B2* | 10/2014 | Henry et al. | A01B 79/005 701/50 |
| 2003/0009286 A1 | 1/2003 | Shibusawa et al. | |
| 2003/0016029 A1* | 1/2003 | Schuler et al. | A01B 35/32 324/643 |
| 2005/0172733 A1 | 8/2005 | Drummond et al. | |
| 2011/0106451 A1 | 5/2011 | Christy et al. | |
| 2015/0323491 A1 | 11/2015 | Miller et al. | |
| 2015/0366125 A1 | 12/2015 | Cross et al. | |

* cited by examiner

AGRICULTURAL SHANK WITH PROTECTED SOIL SENSOR

BACKGROUND OF THE INVENTION

1. Field of the Invention

The present invention relates to agricultural implements, and, more particularly, to agricultural implements which carry shanks.

2. Description of the Related Art

Farmers utilize a wide variety of implements including tillage implements to prepare soil for planting and planting implements for the planting of seeds. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Other agricultural implements that also carry shanks are fertilizer applicators and sub-soilers. Fertilizer applicators can carry shanks which prepare the soil to receive solid, liquid, and/or gaseous fertilizer to increase plant yield in a field. Typically, the shanks carried by fertilizer applicators do not penetrate too deeply into the soil. Sub-soilers, on the other hand, can carry shanks which extend deep into the soil in order to break up a compaction layer, which is also referred to as a hardpan, to allow greater root penetration by the crops. Shanks carried by agricultural implements, therefore, provide various functionalities to the implement depending upon the configuration of the shanks.

One particular challenge of agronomy that has remained unsolved is reliably and conveniently quantifying the form of nitrogen, nitrate-N, which is available in the soil for plant root uptake. One way to determine soil nitrate-N concentration, which can also be referred to as a nitrate-N level, is by subjecting multiple soil samples from a field to various chemical tests in a laboratory environment. While such laboratory chemical tests can be accurate for the specific soil samples tested, the levels of nitrate-N throughout a field can be drastically different depending on the local soil conditions. Further, testing soil samples at a laboratory remote from the field does not provide a farmer with the levels of nitrate-N in the soil samples until days, possibly even weeks, after the soil samples are collected. Thus, the farmer has only limited, possibly unreliable, information to utilize when determining how to dispense fertilizer to the field which can result the nitrate-N levels being too low in one part of the field, reducing potential yield, and too high in another part of the field, wasting fertilizer and/or possibly raising the nitrate-N levels to uneconomical or environmentally unsound levels.

What is needed in the art is a reliable and convenient way for a user to determine soil nitrate-N levels.

SUMMARY OF THE INVENTION

The present invention provides a shank with a sensor defining a probing area and a sensor shield which is configured to direct soil flow away from the sensor without substantially disrupting soil flow into the probing area.

The invention in one form is directed to an agricultural implement including a chassis and a shank carried by the chassis. The shank includes: a shank body configured to penetrate a soil top surface; a sensor attached to an outer surface of the shank body and defining a probing area; and a sensor shield carried by the shank body in front of the sensor, the sensor shield being configured to deflect oncoming soil flow away from the sensor without substantially disrupting soil flow into the probing area.

The invention in another form is directed to a shank including: a shank body configured to penetrate a soil top surface; a sensor attached to an outer surface of the shank body and defining a probing area; and a sensor shield carried by the shank body in front of the sensor, the sensor shield being configured to deflect oncoming soil flow away from the sensor without substantially disrupting soil flow into the probing area An advantage of the present invention is the sensor can determine levels of nitrate-N in the soil as the implement traverses across the field while the sensor shield protects the sensor from damage that may occur due to soil, rocks, or other objects impacting the sensor.

Another advantage is the sensor shield can protect the sensor from damage without frustrating the ability of the sensor to probe the soil.

Yet another advantage is the sensor can provide readings to a controller of the implement which can control other aspects of implement function based on the real-time sensor readings. This could include, but is not limited to, the depth of soil engagement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
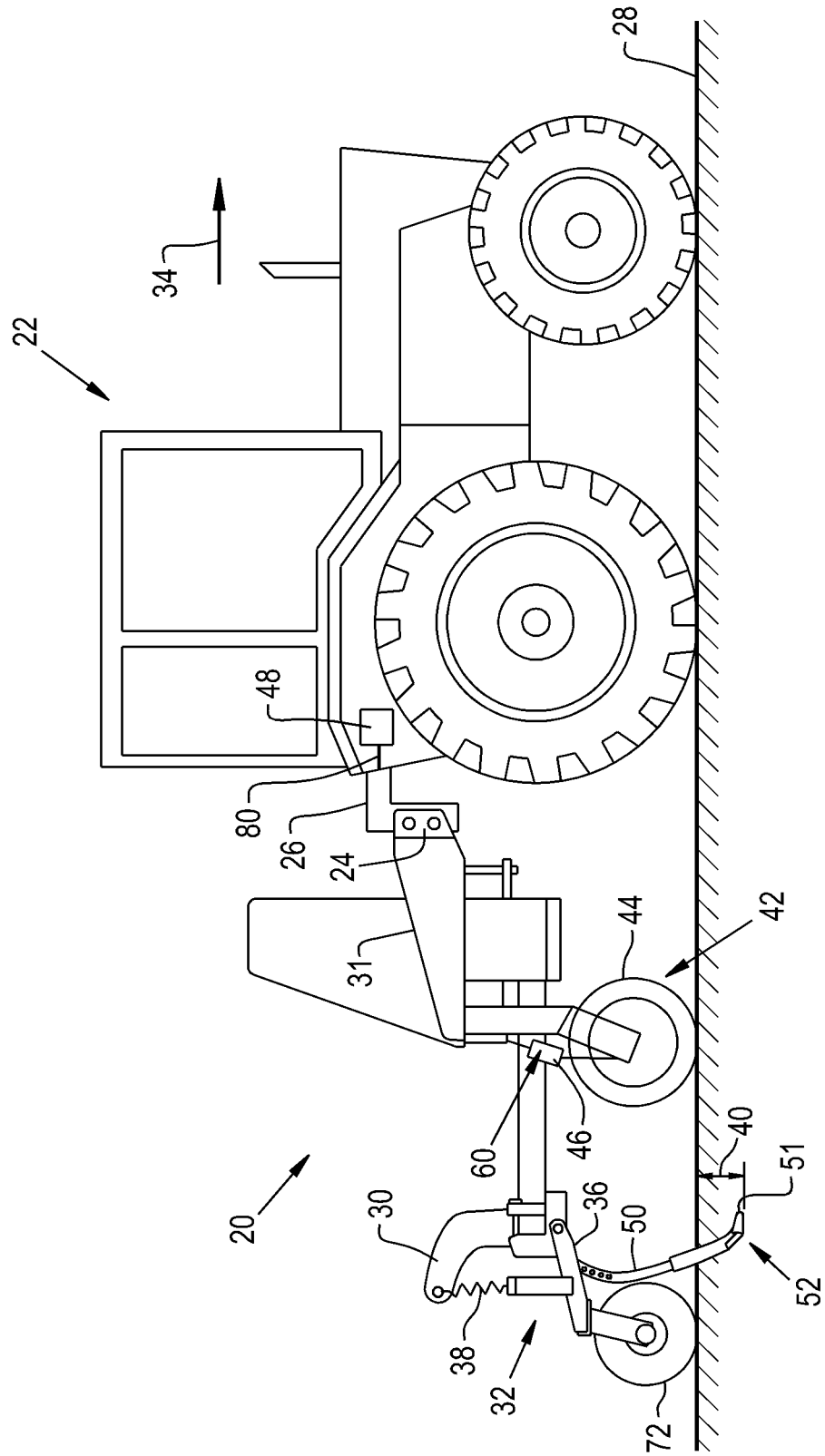
FIG. 1 is a side view of an embodiment of an agricultural implement formed according to the present invention.

Referring now to the drawings, and more particularly to FIG. 1, an embodiment of an agricultural implement 20 formed according to the present invention is shown. The implement 20 is designed to be towed behind a work vehicle, such as the illustrated tractor 22, but it should be appreciated that the implement 20 can also be self-powered by an internal combustion engine or other power source if desired. In the illustrated embodiment, the implement 20 includes a hitch 24 configured to attach to an appropriate tractor hitch assembly 26. The tractor hitch assembly 26 may be adjustable to enable an operator and/or an automated system to vary a height of the implement 20 relative to a soil surface 28, which can also be referred to as a soil top surface, on which the tractor 22 and implement 20 are traveling. As illustrated, the hitch 24 is coupled to an implement frame 30 which is carried by a chassis 31 of the implement 20 and configured to support multiple tools, such as the illustrated shank 32. In this configuration, the shank 32 faces oncoming soil as the implement 20 is towed in a direction of travel 34, as will be further described herein. The shank 32 is supported by an arm 36, which is rotatably coupled to the frame 30. In the illustrated embodiment, a retractor 38 extends between the frame 30 and the arm 36. The retractor 38 is configured to vertically lift up (retract) the shank 32 if any portion of the shank 32 encounters an obstruction (e.g., a rock, tree root, etc.) which applies a resistive force to the shank 32 that exceeds a threshold resistive force, which can be adjusted as desired, thereby substantially protecting components of the shank 32. If desired, the retractor 38 can be configured to pull an entirety of the shank 32 vertically above the soil surface 28 immediately upon the shank 32 experiencing the threshold resistive force. The retractor 38 can be, for example, a spring, as shown, or a hydraulic accumulator commonly employed in European style agricultural implements, as is known.

In certain embodiments, a penetration depth 40 of up to 40 cm of the shank 32 may be adjusted as the implement 20 is pulled through the field for varying reasons. In such embodiments, the trailer hitch 26 may adjust a vertical position of the frame 30 relative to the tractor 22 to vary the penetration depth 40 of the shank 32 within a range of 0 cm to 40 cm deep. In addition, as the height of the frame 30 above the soil surface 28 varies, a wheel assembly 42 may adjust a vertical position of a gauge wheel 44 relative to the frame 30, thereby enabling the wheel assembly 42 to support the frame 30 throughout the range of vertical frame movement. For example, in the illustrated embodiment, the wheel assembly 42 includes an actuator 46 configured to adjust the vertical position of the gauge wheel 44 relative to the frame 30. As will be appreciated, the actuator 46 may be a linear actuator, such as a hydraulic cylinder, a pneumatic cylinder, or an electromechanical actuator, or a rotary actuator, such as a hydraulic servo, or an electric servo. In this sense, the actuator 46 is configured to adjust the penetration depth 40 of the shank 32 within the range of 0 cm to 40 cm deep by adjusting the vertical position of the gauge wheel 44 relative to the frame 30, but it should be appreciated that a separate actuator can also be connected directly to the shank 32 to selectively adjust the penetration depth 40 of the shank 32 within the range of 0 cm to 40 cm deep. The actuator 46 can be electrically coupled to a controller 48 configured to control the actuator 46. The controller 48 can also be coupled to other components of the implement 20 to control operation of various aspects of the implement 20, which is discussed further herein.

Figure 2:
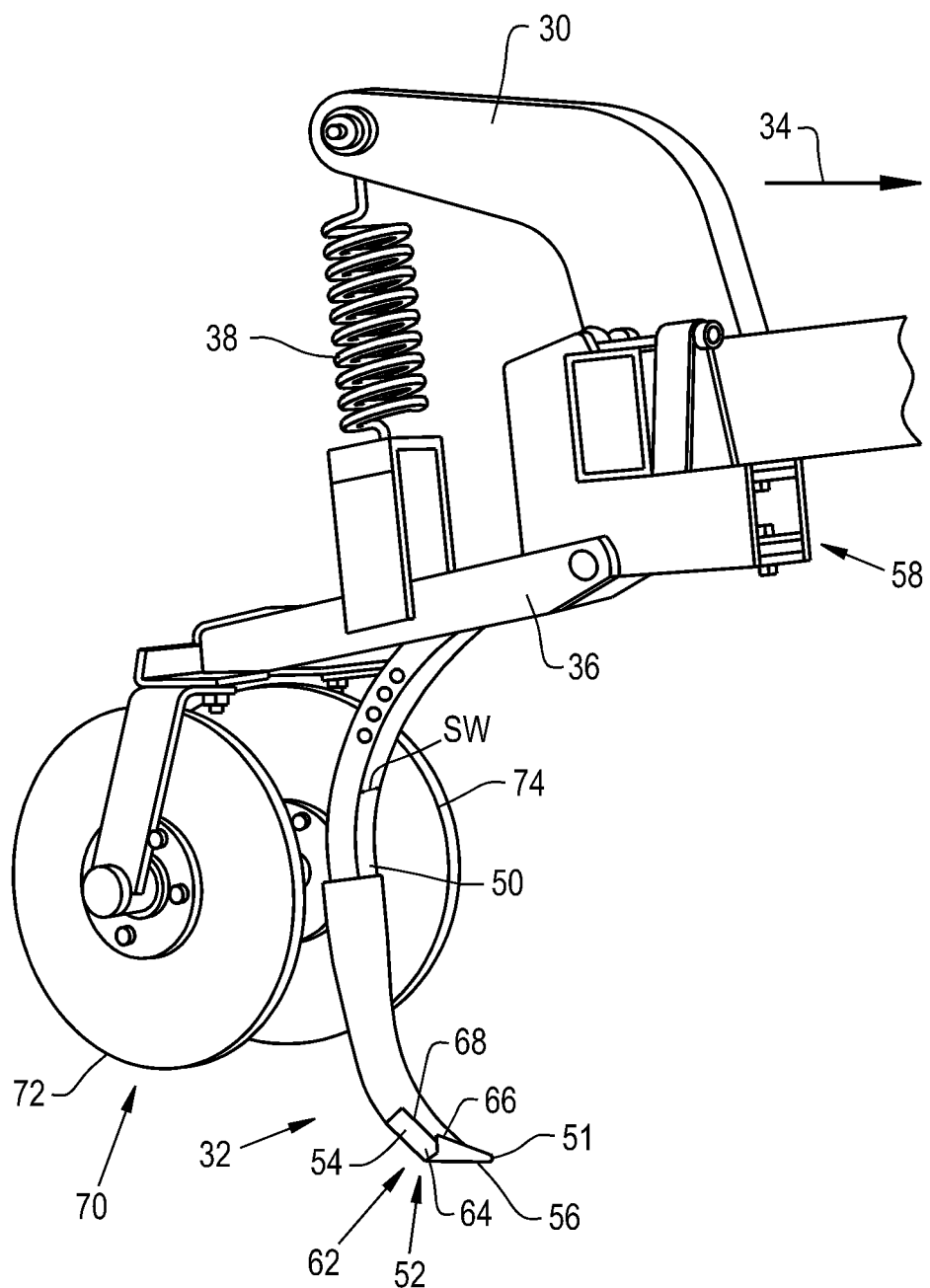
FIG. 2 is a perspective view of an embodiment of a shank formed according to the present invention.

Referring now to FIG. 2, a perspective view of an embodiment of a shank 32 formed according to the present invention is shown. The shank 32 includes a shank body 50 which is configured to partially or completely penetrate the soil surface 28, a sensor 52 attached to an outer surface 54 of the shank body 50, and a sensor shield 56 carried by the shank body 50 in front of the sensor 52. The shank 32 can connect to a mount 58 which can connect to a toolbar 60 carried by the chassis 31 so the shank 32 travels in the travel direction 34 as the tractor 22 pulls the implement 20 across a field. The shank body 50 can have a generally curved structure descending down toward the soil surface 28 during operation and affixed with a tillage point 51, as shown, or have any other suitable construction that allows the shank body 50 to penetrate the soil surface 28 during operation of the implement 20. The shank body 50 can also have a generally rectangular cross-section with a shank width SW of approximately 0.75" to 2.0." It should be appreciated that the shape and size of the shank body 50 can be adjusted as desired in order to better carry out the functionality of the agricultural implement 20, whether the agricultural implement 20 is a field cultivator, a fertilizer applicator, a subsoiler, etc.

The sensor 52 attached to the outer surface 54 of the shank body 50 defines a probing area 62 adjacent the sensor 52 in which the sensor 52 can effectively sense one or more desired parameters. For example, the sensor 52 can be configured as an optical nitrate-N sensor with a window 64 which allows a signal in the form of emitted energy, such as light, from the sensor to contact soil adjacent to the window 64 to determine a concentration of nitrate-N in the soil within the probing area 62. In this sense, the exact size and shape of the probing area 62 will depend upon the configuration of the sensor 52 and the desired sample size. An ionic chemical sensor, for example, may define a probing area at a tip of the sensor which contacts soil, whereas an optical sensor may define a probing area a certain distance away from a window of the sensor. It should thus be appreciated that various sensors will define differing probing areas, depending upon the configuration of the sensor, which can be adjusted as desired to sense different parameters of soil adjacent to the sensor as the sensor is carried by the shank body 50.

A sensor shield 56 is carried by the shank body 50 in front of the sensor 52, relative to the travel direction 34, and is shaped in such a way that the sensor shield 56 deflects oncoming soil away from the sensor 52 without substantially disrupting soil flow into the probing area 62. As used herein, the sensor shield 56 does not "substantially disrupt soil flow into the probing area" so long as the sensor shield 56 does not move so much oncoming soil that the probing area 62 is devoid of sampleable soil as the implement 20 travels in the travel direction 34 and drags the shank 32 and sensor 52 through soil. When the outer surface 54 to which the sensor 52 is attached is a lateral surface of the shank body 50 so the probing area 62 is adjacent a lateral side of the shank body 50, the sensor shield 56 can be shaped with a beveled surface 66 that extends laterally relative to the travel direction 34 so oncoming soil is directed laterally away from the sensor 52. The lateral surface 54 may thus define a lateral edge 68 of the shank body 50, with the beveled surface 66 of the sensor shield 56 extending laterally past the lateral edge 68 to direct oncoming soil away from the sensor 52. The beveled surface 66, which can also be referred to as a deflecting surface, can terminate immediately adjacent to the probing area 62 of the sensor 52 so re-directed soil is forced into the probing area 62, allowing the sensor 52 to analyze the soil. Rather than a flat, beveled surface, the deflecting surface 66 of the sensor shield 56 can be formed with a curvature to have a partial or full conical shape that allows the sensor shield 56 to direct soil away from the sensor 52 without substantially disrupting soil flow into the probing area 62. Thus, the sensor shield 56 can direct oncoming soil flow from colliding with, and possibly damaging, parts of the sensor 52 while also allowing soil flow into the probing area 62 for analysis by the sensor 52.

As the shank 32 travels through soil, the displacement of soil by the shank 32 can cause a slot to form in the soil, which may be undesired. To help close these formed slots, the implement 20 can include a closing device 70 carried behind the shank 32 and configured to at least partially close the formed slot caused by the shank 32 during travel through soil. The closing device 70 may include, for example, a pair of angled disc blades 72, 74 which are coupled to the same arm 36 to which the shank 32 attaches. While the closing device 70 is shown with a pair of disc blades 72, 74, many types of closing devices are known and the closing device 70 of the present invention may be any suitable closing device.

Figure 3:
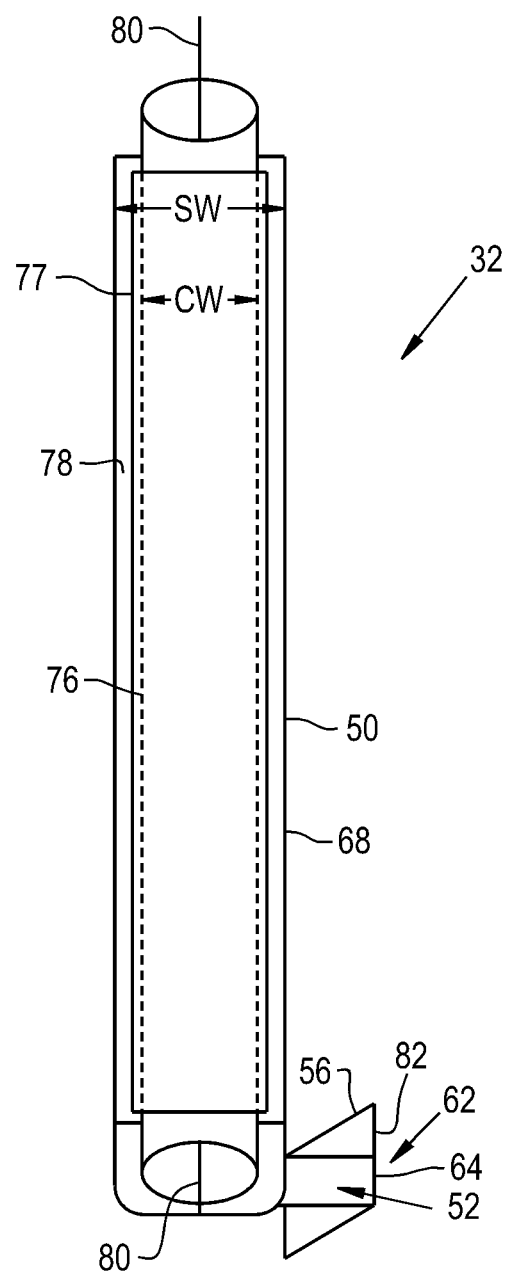
FIG. 3 is a rear view of the shank shown in FIG. 2.

Referring now to FIG. 3, a rear view of the shank 32 is shown so a conduit 76 attached to a rear surface 78 of the shank body 50 can be seen. The conduit 76, which can be formed as a metal or plastic tube, can house a wire 80 which couples the sensor 52 to the controller 42, allowing data acquired by the sensor 52 to be fed to the controller 42 for processing, analysis, and/or subsequent control of other aspects of the implement 20 by the controller 42 as well as allowing electrical power to be provided to the sensor 52 through the wire 80. While the sensor 52 is shown as being coupled to the controller 42 by the wire 80, the sensor 52 can also be configured to transmit signals wirelessly to the controller 42 and have a separate power source, such as a battery. The conduit 76 can be formed with a conduit width CW, or conduit diameter when the conduit 76 is round, which is no greater than the shank width SW of the shank body 50, which can allow the conduit 76 to protect the wire 80 without substantially contributing to slot formation in the soil as the shank 32 travels through the soil. If desired, the conduit 76 may also be rearwardly enclosed by another protective subassembly 77. As can also be seen, a lateral shield edge 82 of the sensor shield 56 can be flush with the window 64 of the sensor 52 so the sensor shield 56 can shield an entire front of the sensor 52 from oncoming soil and other objects, protecting the relatively delicate and expensive sensor 52 from damage caused by impacts as the implement 20 travels across a field.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
    a chassis; and
    a shank carried by the chassis, the shank including:
        a shank body configured to penetrate a soil top surface;
        an optical sensor attached to an outer lateral surface of the shank body, wherein the optical sensor includes a window, at least a portion of the window is positioned laterally outward from the outer lateral surface of the shank body, the window enables a signal emitted by the optical sensor to contact soil adjacent to the window, and the optical sensor defines a probing area adjacent to a lateral side of the shank body; and
        a sensor shield carried by the shank body and positioned at least partially in front of the optical sensor, wherein a portion of the sensor shield is positioned against the window of the optical sensor, the sensor shield is configured to deflect oncoming soil flow away from the optical sensor without substantially disrupting soil flow into the probing area, and the sensor shield extends laterally past the outer lateral surface of the shank body, such that an outer lateral edge of the sensor shield is flush with an outer lateral end of the window.

2. The implement according to claim 1, wherein the sensor shield comprises at least one beveled surface extending laterally relative to the shank body.

3. The implement according to claim 1, wherein the optical sensor is configured to quantify nitrate-N in soil.

4. The implement according to claim 1, further comprising a controller carried by the chassis above the optical sensor and coupled to the optical sensor.

5. The implement according to claim 4, further comprising a conduit attached to the shank body and at least one wire coupling the controller and the optical sensor, the wire being at least partially housed within the conduit.

6. The implement according to claim 5, wherein the shank body defines a shank width and the conduit attaches to a rear surface of the shank body, the conduit having a conduit width which is no greater than the shank width.

7. The implement according to claim 1, further comprising a retractor coupled to the shank and the chassis, the retractor configured to vertically pull up the shank body carrying the optical sensor when the shank body experiences a threshold resistive force.

8. The implement according to claim 1, further comprising a closing device carried behind the shank and configured to at least partially close a slot formed by the shank during travel through soil.

9. A shank for an agricultural implement, comprising:
    a shank body configured to penetrate a soil top surface;
    an optical sensor attached to an outer lateral surface of the shank body, wherein the optical sensor includes a window, at least a portion of the window is positioned laterally outward from the outer lateral surface of the shank body, the window enables a signal emitted by the optical sensor to contact soil adjacent to the window, and the optical sensor defines a probing area adjacent to a lateral side of the shank body; and
    a sensor shield carried by the shank body and positioned at least partially in front of the optical sensor, wherein a portion of the sensor shield is positioned against the window of the optical sensor, the sensor shield is configured to deflect oncoming soil flow away from the optical sensor without substantially disrupting soil flow into the probing area, and the sensor shield extends laterally past the outer lateral surface of the shank body, such that an outer lateral edge of the sensor shield is flush with an outer lateral end of the window.

10. The shank according to claim 9, wherein the sensor shield comprises at least one beveled surface extending laterally relative to the shank body.

11. The shank according to claim 9, wherein the optical sensor is configured to quantify nitrate-N in soil.

12. The shank according to claim 9, further comprising a conduit attached to a rear surface of the shank body, the shank body defining a shank width and the conduit having a conduit width which is no greater than the shank width.

* * * * *